No. 807,578. PATENTED DEC. 19, 1905.
C. ROBINSON.
SPEED ADJUSTING DEVICE FOR FLUID PRESSURE ENGINES.
APPLICATION FILED JUNE 28, 1900.
2 SHEETS—SHEET 2.
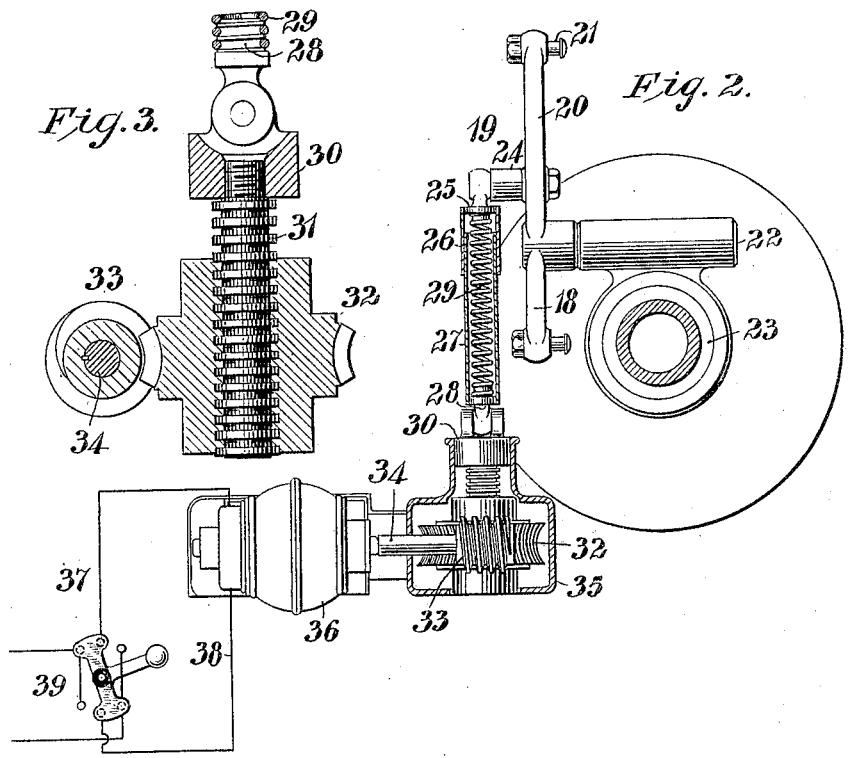
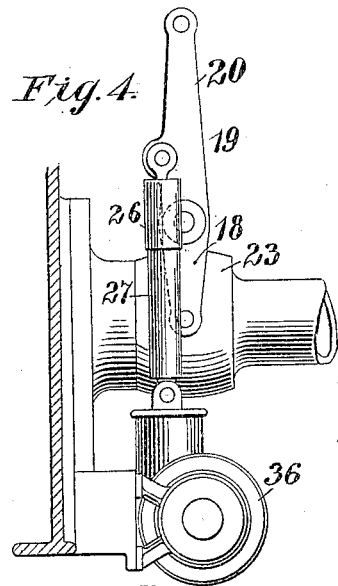
WITNESSES:
C. L. Belcher
Birney Hines
INVENTOR
Cyrus Robinson
BY Wesley G. Carr
ATTORNEY.

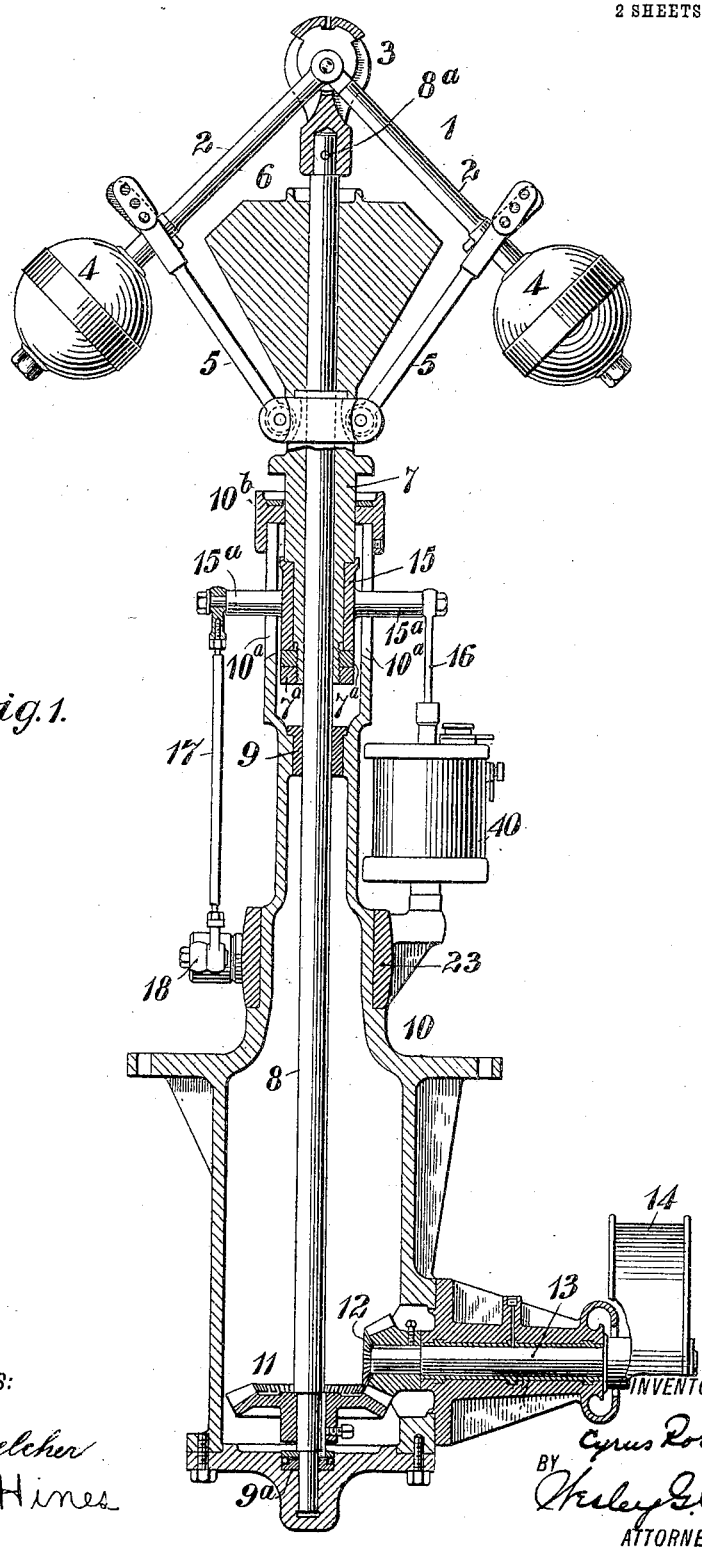

UNITED STATES PATENT OFFICE.

CYRUS ROBINSON, OF EDGEWOOD PARK, PENNSYLVANIA, ASSIGNOR TO WESTINGHOUSE MACHINE COMPANY, A CORPORATION OF PENNSYLVANIA.

SPEED-ADJUSTING DEVICE FOR FLUID-PRESSURE ENGINES.

No. 807,578.     Specification of Letters Patent.     Patented Dec. 19, 1905.

Application filed June 28, 1900. Serial No. 22,004.

*To all whom it may concern:*

Be it known that I, CYRUS ROBINSON, a subject of the Queen of Great Britain, residing at Edgewood Park, in the county of Allegheny and State of Pennsylvania, have invented a new and useful Improvement in Speed-Adjusting Devices for Fluid-Pressure Engines, of which the following is a specification.

This invention relates to engines, and more particularly to governing apparatus therefor.

An object of this invention is the production of means in connection with an engine-governor whereby the speed of the engine may be varied from time to time at the will of the operator.

In engines designed to operate alternating-current generators it is particularly necessary to provide means whereby the governing mechanism is placed under the control of an attendant at the switchboard from which the current is distributed in order that the speed of the engines may be varied at will for synchronizing the alternators. In accomplishing this I employ means for changing the governor adjustment which consists, broadly, in varying the counterbalancing force of the governor in accordance with desired changes in engine speed.

In fly-ball governors the changes of position of the governor or valve-controlling collar which is actuated by the governor-balls do not directly correspond to the variations in speed of the engine. For this reason it is customary in the design of such governors to plot a curve utilizing the revolutions of the engine as abscissæ and the positions of the valve-controlling collar along the governor shaft or standards as ordinates, and it is also customary to plot what may be called a "regulating curve," in which the revolutions per minute of the engine are abscissæ and the actuating forces transmitted by the governor-balls to the valve-controlling collar at the different speeds of the engine are the ordinates. The governing mechanism is then so adjusted that the movement of the governor between the points of maximum and minimum speed regulation shall correspond to that portion of the first curve referred to where there is the least departure from uniformity of engine-speed variation and the variation of position of the governor or valve controlling collar. It is obvious that all voluntary adjustment of the engine speed should be effected without materially changing the form of the regulating curve which has been selected to insure a successful automatic regulation.

It is therefore an object of my invention to utilize means for obtaining voluntary regulation in which the engine speed is either retarded or increased without materially affecting the automatic regulation.

These and other objects I attain in a governor mechanism embodying the features herein described, and illustrated in the accompanying drawings throughout the several views, of which the same parts are designated by corresponding numerals.

Figure 1 is a vertical sectional view of an engine-governor embodying this invention. Fig. 2 is a view, partially in horizontal section and partially in plan, of the speed-adjusting device. Fig. 3 is a sectional detail view of some of the parts shown in Fig. 2. Fig. 4 is a side elevation of the parts shown in Fig. 2.

As shown and described, the invention is designed for use in connection with a steam-engine, and for convenience it will be so described. I desire it to be understood, however, that I do not limit its application to steam-engines or to any specific type of fluid-pressure engines or motors.

The governor 1, which is shown as of the pendulum or ball type, has arms 2, that are pivoted at their upper ends to a head 3 and are provided at their lower ends with balls 4, as is usual in governors of this character. The outer ends of the arms 2 are connected, by means of links or rods 5, to a balancing-weight 6, which has a downwardly-extending sleeve 7.

The parts thus far described are supported upon a vertical shaft 8, the head 3 being rigidly fastened to the upper end of the shaft by means of a pin $8^a$ and the weight 6 and its sleeve 7 being movable longitudinally thereon by centrifugal force acting through the governor-balls 4. The shaft 8 has bearings at 9 and $9^a$ in a frame 10 and is provided at or near its lower end with a bevel gear-wheel 11, which meshes with a bevel-gear 12 on the end of a shaft 13. The shaft 13 receives motion from the engine-shaft (not shown) by means of suitable gearing, a pulley 14 being here shown as a part of such gearing.

The lower end of the sleeve 7 is reduced in diameter, and the reduced portion is surrounded by a collar 15, that constitutes a bearing for the sleeve and is provided oppositely with arms 15ª, that project through guide-slots 10ª in the upper end of the frame 10. The collar 15 is held in position on the sleeve 7 by nuts 7ª, and the upper end of the frame 10 is provided with a cap-piece 10ᵇ, that constitutes a bearing for the sleeve 7. One of the arms 15ª is connected by rods 16 to the piston of a gag-pot 40, and the other arm is connected, by means of a rod 17, with one arm 18 of a valve-motion lever 19. The valve-motion lever 19 has another arm 20, projecting in the opposite direction from the arm 18, and its outer end is provided with a pin 21, through which connection is made by means of suitable rods and links to the valve-gear of the engine. (Not shown.) If the engine is of the Corliss type, this connection will be made to the knock-off cams of the valve-gear. The valve-motion lever 19 is journaled upon a rod or shaft 22, projecting from a cylindrical support 23, that surrounds and is supported by the frame 10. At a suitable point between its outer end and the supporting-shaft 22 the arm 20 is provided with a pin 24, on which is mounted one end of a head 25. This head has a casing 26, that makes a telescoping engagement with a similar casing 27, provided at its outer end with a head 28. Heads 25 and 28 are connected by a spiral spring 29, the telescoping casings being provided in order to protect and guide the spring. The head 28 is pivotally connected to a block 30, which is rigidly connected to one end of a screw 31. Mounted upon the screw 31 is a worm-wheel 32, the hub of the wheel being internally screw-threaded to engage with the said screw 31. A worm 33 is supported by a shaft 34 in position to mesh with the worm-wheel 32, and these parts are all inclosed in and suitably supported by a casing 35. The shaft 34 is coupled or otherwise geared to the armature-shaft of an electric motor 36, the currents for operating this motor being supplied through conductors 37 and 38, a suitable switch 39 being provided for the purpose of opening and closing the circuit and reversing the circuit connections in order to stop, start, and reverse the motor-armature. This switch may obviously be of any suitable construction and may be located at any point to suit the convenience of the operator in charge.

The automatic operation of the governor to maintain an approximately constant engine speed is well understood by those skilled in the art, and therefore requires no description. If an adjustment of the speed of the engine that shall be independent of fluctuations of load is desired, the switch 39 is manipulated in the one direction or the other in order to close the circuit of the motor 36, so as to insure either a forward or a backward motion of its armature. If the direction of the motion is such as to "take up" the screw 31, a tensile strain will be exerted upon the spring 29, and the force thus exerted will be transmitted through the valve-motion lever 19 to the valve-gear, and thus effect a shortening of the cut-off, and consequently a decrease in the engine speed. A reversal of the motor by means of the swich 39 will obviously effect an increase in the engine speed through a reversal of the action of the parts above referred to. It is obviously extremely desirable that all voluntary adjustments of engine speed shall be effected without material change in the form of the regulation curve that has been carefully selected to insure successful automatic regulation. In the operation of my present invention the regulation curve is either raised or lowered, according to the direction of the electric motor, without effecting any material change in its form, and therefore without disturbing the conditions that are essential to the best results in the automatic regulation. The location of the pin 24 on the valve-motion lever is therefore so selected that the combination of leverages will not cause the governor to depart materially from its regulation curve. This is an important and valuable characteristic where two or more independently-governed engines are employed to operate a common load that may tend to throw said engines out of synchronous operation. The construction of weighted pendulum-governors is as a rule such that any addition to the counterweight disturbs the regulation curve so as to give a different characteristic. It follows, therefore, that where one governor is loaded more than the other, assuming that only two engines are employed, by reason of a difference in the valve adjustments the two governors will not regulate in the same time and amount throughout the range of load. By employing my invention this difficulty is overcome, since the position, but not the form, of regulation curve is changed.

While I have shown and described specific mechanism for practicing my invention, I desire it to be understood that the invention is intended to cover and include all modifications and variations that do not involve material changes in mode of operation and result.

I claim as my invention—

1. The combination with an engine-governor and valve-motion lever connected thereto, of a motor, starting, stopping and reversing means therefor and gearing between said motor and the valve-motion lever whereby the position of the latter may be adjusted in accordance with the engine speed desired and regulation curves substantially alike in character maintained at the different speeds.

2. The combination with an engine-governor and a valve-motion lever connected thereto, of a motor, starting, stopping and reversing means therefor, gearing operated by said motor and a flexible connection between said gearing and said valve-motion lever whereby the latter may be adjusted in accordance with the engine speed desired and regulation curves of substantially the same characteristics maintained.

3. The combination with an engine-governor and a valve-motion lever connected thereto, of a motor, starting, stopping and reversing means therefor, gearing operated by said motor, a spring having one end connected to the valve-motion lever and an adjusting connection between the other end of the spring and the gearing whereby the position of the valve-motion lever may be adjusted in accordance with the engine speed desired and regulation curves maintained of substantially the same characteristics.

4. The combination with an engine-governor and a valve-motion lever connected thereto, of a motor, starting, stopping and reversing means therefor, gearing operated by said motor, a screw operated by said gearing and a spring interposed between one end of the screw and the valve-motion lever whereby the position of the latter may be adjusted in accordance with the engine speed desired and regulation curves maintained of substantially the same characteristics.

5. The combination with an engine-governor and a valve-motion lever connected thereto, of an electric motor, a starting, stopping and reversing switch therefor, worm-gearing operated by said motor, a spring having one end connected to the valve-motion lever and having its other end connected to a device actuated by said worm-gearing whereby the valve-motion lever may be adjusted in accordance with the engine speed desired and regulation curves of substantially the same characteristics maintained.

6. The combination with an engine-governor and a pivoted valve-motion lever having one end connected thereto, of an electric motor, a starting, stopping and reversing switch therefor, gearing operated by said motor and a yielding or flexible connection between the gearing and the valve-motion lever, the effective length of which is varied by said gearing, whereby the position of the valve-motion lever is adjusted in accordance with the engine speed desired and regulation curves of substantially the same characteristics maintained.

7. The combination with an engine-governor and a valve-motion lever having one end connected thereto, of a motor, starting, stopping and reversing means therefor and adjusting mechanism interposed between the motor and the valve-motion lever, said mechanism being connected to the lever at such a point as to maintain regulation curves at different speeds of substantially the same characteristics.

8. In a governor mechanism for engines, a wheel threaded upon a screw-rod, means for holding one of said parts against longitudinal movement whereby the rotation of the wheel will cause the other of said parts to move longitudinally in one or the other direction, means whereby the to-and-fro motion of the moving part is caused to vary the resistance of the governor mechanism, means for rotating said wheel comprising an electric motor and gearing between the shaft of said motor and said wheel.

9. The combination with an engine and its valve-gear-operating lever, of a governor device operatively connected to said lever, and instrumentalities, including an electric motor, whereby said governor device may be subjected to different loads for modifying its operation to vary the normal speed of the engine.

10. The combination with an engine and its valve-gear-operating lever, of a governor device operatively connected to said lever, and instrumentalities, including an electrically-operated agent, whereby said governor device may be subjected to different loads for modifying its operation to vary the normal speed of the engine.

11. The combination with an engine and its valve-gear-operating lever, of a governor device operatively connected to said lever, and instrumentalities, including an electrically-operated agent, whereby the operation of said governor device may be modified to vary the normal speed of the engine, and means whereby the engine, due to the tendency of said instrumentalities to overrun, is prevented from hunting.

12. The combination with an engine and its valve-gear-operating lever, of a governor device operatively connected to said lever, and instrumentalities, including an electrically-operated agent, whereby the operation of said governor device may be yieldingly modified to vary the normal speed of the engine, and means whereby the engine, due to the tendency of said instrumentalities to overrun, is prevented from hunting.

I testimony whereof I have hereunto subscribed my name this 26th day of June, 1900.

CYRUS ROBINSON.

Witnesses:
JAMES B. YOUNG,
IVAN S. EKMAN.